United States Patent
Niu et al.

(10) Patent No.: US 9,908,310 B2
(45) Date of Patent: Mar. 6, 2018

(54) ELECTRONIC DEVICE WITH A REDUCED FRICTION SURFACE

(71) Applicant: Apple Inc., Cupertino, CA (US)

(72) Inventors: James J. Niu, Cupertino, CA (US); Craig C. Leong, Cupertino, CA (US); Michael K. Pilliod, Cupertino, CA (US); Keith J. Hendren, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/326,858

(22) Filed: Jul. 9, 2014

(65) Prior Publication Data

US 2015/0016038 A1    Jan. 15, 2015

Related U.S. Application Data

(60) Provisional application No. 61/844,833, filed on Jul. 10, 2013.

(51) Int. Cl.
```
H01H 13/02      (2006.01)
G06F 3/02       (2006.01)
B32B 27/08      (2006.01)
B29C 70/64      (2006.01)
C08K 7/20       (2006.01)
```
(Continued)

(52) U.S. Cl.
CPC .............. *B32B 27/08* (2013.01); *B29C 70/64* (2013.01); *B29C 70/78* (2013.01); *B32B 7/12* (2013.01); *B32B 27/14* (2013.01); *B32B 27/34* (2013.01); *B32B 27/365* (2013.01); *C08K 7/20* (2013.01); *H01H 13/85* (2013.01); *H01H 13/88* (2013.01); *B32B 2264/101* (2013.01); *B32B 2274/00* (2013.01); *B32B 2307/51* (2013.01); *B32B 2307/702* (2013.01); *B32B 2457/00* (2013.01); *G06F 3/0202* (2013.01); *H01H 3/125* (2013.01);
(Continued)

(58) Field of Classification Search
CPC .............. B41F 17/006; H01H 2229/01; H01H 2229/012; H01H 13/88
See application file for complete search history.

(56) References Cited

U.S. PATENT DOCUMENTS 3,657,492 A    4/1972    Arndt et al.
3,917,917 A    11/1975   Murata
(Continued)

FOREIGN PATENT DOCUMENTS

CN    2155620    2/1994
CN    2394309    8/2000
(Continued)

OTHER PUBLICATIONS

Elekson, "Reliable and Tested Wearable Electronics Embedment Solutions," http://www.wearable.technology/our-technologies, 3 pages, at least as early as Jan. 6, 2016.

*Primary Examiner* — Daniel J Colilla
(74) *Attorney, Agent, or Firm* — Brownstein Hyatt Farber Schreck, LLP

(57) ABSTRACT

A surface of an electronic device includes a reduced friction surface that comprises a glass beaded film. The glass beaded film includes glass beads disposed in a polymer layer or in an adhesive layer, where a portion of the glass beads protrude from a surface of the polymer or adhesive layer. The reduced friction surface is disposed over at least a portion of the surface of the electronic device.

20 Claims, 10 Drawing Sheets

(51) Int. Cl.
*B29C 70/78* (2006.01)
*H01H 13/85* (2006.01)
*H01H 13/88* (2006.01)
*B32B 7/12* (2006.01)
*B32B 27/14* (2006.01)
*B32B 27/34* (2006.01)
*B32B 27/36* (2006.01)
*H01H 3/12* (2006.01)

(52) U.S. Cl.
CPC ... *H01H 2215/00* (2013.01); *H01H 2231/002* (2013.01); *Y10T 428/24413* (2015.01)

(56) References Cited

U.S. PATENT DOCUMENTS

| | | | |
|---|---|---|---|
| 3,978,297 | A | 8/1976 | Lynn et al. |
| 4,095,066 | A | 6/1978 | Harris |
| 4,319,099 | A | 3/1982 | Asher |
| 4,349,712 | A | 9/1982 | Michalski |
| 4,484,042 | A | 11/1984 | Matsui |
| 4,598,181 | A | 7/1986 | Selby |
| 4,670,084 | A * | 6/1987 | Durand ............... B41F 17/006 100/322 |
| 4,755,645 | A | 7/1988 | Naoki et al. |
| 4,937,408 | A | 6/1990 | Hattori et al. |
| 5,021,638 | A | 6/1991 | Nopper et al. |
| 5,092,459 | A | 3/1992 | Uljanic et al. |
| 5,136,131 | A | 8/1992 | Komaki |
| 5,278,372 | A | 1/1994 | Takagi et al. |
| 5,280,146 | A | 1/1994 | Inagaki et al. |
| 5,340,955 | A | 8/1994 | Calvillo et al. |
| 5,382,762 | A | 1/1995 | Mochizuki |
| 5,421,659 | A | 6/1995 | Liang |
| 5,422,447 | A | 6/1995 | Spence |
| 5,457,297 | A | 10/1995 | Chen |
| 5,477,430 | A | 12/1995 | LaRose et al. |
| 5,481,074 | A | 1/1996 | English |
| 5,504,283 | A | 4/1996 | Kako et al. |
| 5,512,719 | A | 4/1996 | Okada et al. |
| 5,625,532 | A | 4/1997 | Sellers |
| 5,804,780 | A | 9/1998 | Bartha |
| 5,828,015 | A | 10/1998 | Coulon |
| 5,847,337 | A | 12/1998 | Chen |
| 5,874,700 | A | 2/1999 | Hochgesang |
| 5,875,013 | A | 2/1999 | Takahara |
| 5,876,106 | A | 3/1999 | Kordecki et al. |
| 5,878,872 | A | 3/1999 | Tsai |
| 5,881,866 | A | 3/1999 | Miyajima et al. |
| 5,935,691 | A | 8/1999 | Tsai |
| 5,960,942 | A | 10/1999 | Thornton |
| 5,986,227 | A | 11/1999 | Hon |
| 6,020,565 | A | 2/2000 | Pan |
| 6,215,420 | B1 | 4/2001 | Harrison et al. |
| 6,257,782 | B1 | 7/2001 | Maruyama et al. |
| 6,259,046 | B1 | 7/2001 | Iwama et al. |
| 6,377,685 | B1 | 4/2002 | Krishnan |
| 6,388,219 | B2 | 5/2002 | Hsu et al. |
| 6,482,032 | B1 | 11/2002 | Szu et al. |
| 6,530,283 | B2 | 3/2003 | Okada et al. |
| 6,538,801 | B2 | 3/2003 | Jacobson et al. |
| 6,542,355 | B1 | 4/2003 | Huang |
| 6,552,287 | B2 | 4/2003 | Janniere |
| 6,556,112 | B1 | 4/2003 | Van Zeeland et al. |
| 6,559,399 | B2 | 5/2003 | Hsu et al. |
| 6,572,289 | B2 | 6/2003 | Lo et al. |
| 6,573,463 | B2 | 6/2003 | Ono |
| 6,585,435 | B2 | 7/2003 | Fang |
| 6,624,369 | B2 | 9/2003 | Ito et al. |
| 6,706,986 | B2 | 3/2004 | Hsu |
| 6,738,050 | B2 | 5/2004 | Comiskey |
| 6,750,414 | B2 | 6/2004 | Sullivan |
| 6,759,614 | B2 | 7/2004 | Yoneyama |
| 6,762,381 | B2 | 7/2004 | Kunthady et al. |
| 6,788,450 | B2 | 9/2004 | Kawai et al. |
| 6,797,906 | B2 | 9/2004 | Ohashi |
| 6,850,227 | B2 | 2/2005 | Takahashi et al. |
| 6,860,660 | B2 | 3/2005 | Hochgesang et al. |
| 6,926,418 | B2 | 8/2005 | Osterg.ang.rd et al. |
| 6,940,030 | B2 | 9/2005 | Takeda et al. |
| 6,977,352 | B2 | 12/2005 | Oosawa |
| 6,979,792 | B1 | 12/2005 | Lai |
| 6,987,466 | B1 | 1/2006 | Welch et al. |
| 6,987,503 | B2 | 1/2006 | Inoue |
| 7,012,206 | B2 | 3/2006 | Oikawa |
| 7,030,330 | B2 | 4/2006 | Suda |
| 7,038,832 | B2 | 5/2006 | Kanbe |
| 7,129,930 | B1 | 10/2006 | Cathey et al. |
| 7,134,205 | B2 | 11/2006 | Bruennel |
| 7,146,701 | B2 | 12/2006 | Mahoney et al. |
| 7,151,236 | B2 | 12/2006 | Ducruet et al. |
| 7,151,237 | B2 | 12/2006 | Mahoney et al. |
| 7,154,059 | B2 | 12/2006 | Chou |
| 7,166,813 | B2 | 1/2007 | Soma |
| 7,172,303 | B2 | 2/2007 | Shipman et al. |
| 7,189,932 | B2 | 3/2007 | Kim |
| 7,256,766 | B2 | 8/2007 | Albert et al. |
| 7,283,119 | B2 | 10/2007 | Kishi |
| 7,301,113 | B2 | 11/2007 | Nishimura et al. |
| 7,378,607 | B2 | 5/2008 | Koyano et al. |
| 7,385,806 | B2 | 6/2008 | Liao |
| 7,391,555 | B2 | 6/2008 | Albert et al. |
| 7,414,213 | B2 | 8/2008 | Hwang et al. |
| 7,429,707 | B2 | 9/2008 | Yanai et al. |
| 7,432,460 | B2 | 10/2008 | Clegg |
| 7,510,342 | B2 | 3/2009 | Lane et al. |
| 7,531,764 | B1 | 5/2009 | Lev et al. |
| 7,541,554 | B2 | 6/2009 | Hou |
| 7,639,187 | B2 | 12/2009 | Caballero et al. |
| 7,639,571 | B2 | 12/2009 | Ishii et al. |
| 7,679,010 | B2 | 3/2010 | Wingett |
| 7,724,415 | B2 | 5/2010 | Yamaguchi |
| 7,781,690 | B2 | 8/2010 | Ishii |
| 7,813,774 | B2 | 10/2010 | Perez-Noguera |
| 7,842,895 | B2 | 11/2010 | Lee |
| 7,847,204 | B2 | 12/2010 | Tsai |
| 7,851,819 | B2 | 12/2010 | Shi |
| 7,866,866 | B2 | 1/2011 | Wahlstrom |
| 7,893,376 | B2 | 2/2011 | Chen |
| 7,923,653 | B2 | 4/2011 | Ohsumi |
| 7,947,915 | B2 | 5/2011 | Lee et al. |
| 7,999,748 | B2 | 8/2011 | Ligtenberg et al. |
| 8,063,325 | B2 | 11/2011 | Sung et al. |
| 8,077,096 | B2 | 12/2011 | Chiang et al. |
| 8,080,744 | B2 | 12/2011 | Yeh et al. |
| 8,098,228 | B2 | 1/2012 | Shimodaira et al. |
| 8,109,650 | B2 | 2/2012 | Chang et al. |
| 8,119,945 | B2 | 2/2012 | Lin |
| 8,124,903 | B2 | 2/2012 | Tatehata et al. |
| 8,134,094 | B2 | 3/2012 | Tsao et al. |
| 8,143,982 | B1 | 3/2012 | Lauder et al. |
| 8,156,172 | B2 | 4/2012 | Muehl et al. |
| 8,184,021 | B2 | 5/2012 | Chou |
| 8,212,160 | B2 | 7/2012 | Tsao |
| 8,212,162 | B2 | 7/2012 | Zhou |
| 8,218,301 | B2 | 7/2012 | Lee |
| 8,232,958 | B2 | 7/2012 | Tolbert |
| 8,246,228 | B2 | 8/2012 | Ko et al. |
| 8,253,048 | B2 | 8/2012 | Ozias et al. |
| 8,253,052 | B2 | 8/2012 | Chen |
| 8,263,887 | B2 | 9/2012 | Chen et al. |
| 8,289,280 | B2 | 10/2012 | Travis |
| 8,299,382 | B2 | 10/2012 | Takemae et al. |
| 8,317,384 | B2 | 11/2012 | Chung et al. |
| 8,319,298 | B2 | 11/2012 | Hsu |
| 8,325,141 | B2 | 12/2012 | Marsden |
| 8,330,725 | B2 | 12/2012 | Mahowald et al. |
| 8,354,629 | B2 | 1/2013 | Lin |
| 8,378,857 | B2 | 2/2013 | Pance |
| 8,383,972 | B2 | 2/2013 | Liu |
| 8,384,566 | B2 | 2/2013 | Bocirnea |
| 8,404,990 | B2 | 3/2013 | Lutgring et al. |
| 8,431,849 | B2 | 4/2013 | Chen |
| 8,436,265 | B2 | 5/2013 | Koike et al. |

(56) References Cited

U.S. PATENT DOCUMENTS

| | | | |
|---|---|---|---|
| 8,451,146 B2 | 5/2013 | Mahowald et al. | |
| 8,462,514 B2 | 6/2013 | Myers et al. | |
| 8,500,348 B2 | 8/2013 | Dumont et al. | |
| 8,502,094 B2 | 8/2013 | Chen | |
| 8,542,194 B2 | 9/2013 | Akens et al. | |
| 8,548,528 B2 | 10/2013 | Kim et al. | |
| 8,569,639 B2 | 10/2013 | Strittmatter | |
| 8,575,632 B2 | 11/2013 | Kuramoto et al. | |
| 8,581,127 B2 | 11/2013 | Jhuang et al. | |
| 8,592,699 B2 | 11/2013 | Kessler et al. | |
| 8,592,702 B2 | 11/2013 | Tsai | |
| 8,592,703 B2 | 11/2013 | Johnson et al. | |
| 8,604,370 B2 | 12/2013 | Chao | |
| 8,629,362 B1 | 1/2014 | Knighton et al. | |
| 8,651,720 B2 | 2/2014 | Sherman et al. | |
| 8,659,882 B2 | 2/2014 | Liang et al. | |
| 8,731,618 B2 | 5/2014 | Jarvis et al. | |
| 8,748,767 B2 | 6/2014 | Ozias et al. | |
| 8,759,705 B2 | 6/2014 | Funakoshi et al. | |
| 8,760,405 B2 | 6/2014 | Nam | |
| 8,786,548 B2 | 7/2014 | Oh et al. | |
| 8,791,378 B2 | 7/2014 | Lan | |
| 8,835,784 B2 | 9/2014 | Hirota | |
| 8,847,711 B2 | 9/2014 | Yang et al. | |
| 8,854,312 B2 | 10/2014 | Meierling | |
| 8,870,477 B2 | 10/2014 | Merminod et al. | |
| 8,884,174 B2 | 11/2014 | Chou et al. | |
| 8,921,473 B1 | 12/2014 | Hyman | |
| 8,922,476 B2 | 12/2014 | Stewart et al. | |
| 8,943,427 B2 | 1/2015 | Heo et al. | |
| 8,976,117 B2 | 3/2015 | Krahenbuhl et al. | |
| 8,994,641 B2 | 3/2015 | Stewart et al. | |
| 9,007,297 B2 | 4/2015 | Stewart et al. | |
| 9,063,627 B2 | 6/2015 | Yairi et al. | |
| 9,086,733 B2 | 7/2015 | Pance | |
| 9,087,663 B2 | 7/2015 | Los | |
| 9,213,416 B2 | 12/2015 | Chen | |
| 9,223,352 B2 | 12/2015 | Smith et al. | |
| 9,234,486 B2 | 1/2016 | Das et al. | |
| 9,235,236 B2 | 1/2016 | Nam | |
| 9,274,654 B2 | 3/2016 | Slobodin et al. | |
| 9,275,810 B2 | 3/2016 | Pance et al. | |
| 9,300,033 B2 | 3/2016 | Han et al. | |
| 9,305,496 B2 | 4/2016 | Kimura | |
| 9,443,672 B2 | 9/2016 | Martisauskas | |
| 9,448,628 B2 | 9/2016 | Tan et al. | |
| 9,471,185 B2 | 10/2016 | Guard | |
| 9,612,674 B2 | 4/2017 | Degner et al. | |
| 2002/0027065 A1* | 3/2002 | Kenmochi | H01H 13/705 200/314 |
| 2002/0079211 A1 | 6/2002 | Katayama et al. | |
| 2002/0093436 A1 | 7/2002 | Lien | |
| 2002/0113770 A1 | 8/2002 | Jacobson et al. | |
| 2002/0149835 A1 | 10/2002 | Kanbe | |
| 2003/0169232 A1 | 9/2003 | Ito | |
| 2004/0004559 A1 | 1/2004 | Rast | |
| 2004/0225965 A1 | 11/2004 | Garside et al. | |
| 2004/0257247 A1 | 12/2004 | Lin et al. | |
| 2005/0035950 A1 | 2/2005 | Daniels | |
| 2005/0042013 A1* | 2/2005 | Lee | G06F 1/1613 400/490 |
| 2005/0253801 A1 | 11/2005 | Kobayashi | |
| 2006/0011458 A1 | 1/2006 | Purcocks | |
| 2006/0020469 A1 | 1/2006 | Rast | |
| 2006/0120790 A1 | 6/2006 | Chang | |
| 2006/0181511 A1 | 8/2006 | Woolley | |
| 2006/0243987 A1 | 11/2006 | Lai | |
| 2007/0200823 A1 | 8/2007 | Bytheway et al. | |
| 2007/0285393 A1 | 12/2007 | Ishakov | |
| 2008/0131184 A1 | 6/2008 | Brown et al. | |
| 2008/0136782 A1 | 6/2008 | Mundt et al. | |
| 2009/0046053 A1 | 2/2009 | Shigehiro et al. | |
| 2009/0103964 A1 | 4/2009 | Takagi et al. | |
| 2009/0128496 A1 | 5/2009 | Huang | |
| 2009/0262085 A1 | 10/2009 | Wassingbo et al. | |
| 2009/0267892 A1 | 10/2009 | Faubert | |
| 2010/0045705 A1 | 2/2010 | Vertegaal et al. | |
| 2010/0066568 A1 | 3/2010 | Lee | |
| 2010/0156796 A1 | 6/2010 | Kim et al. | |
| 2010/0213044 A1 | 8/2010 | Strittmatter et al. | |
| 2010/0253630 A1 | 10/2010 | Homma et al. | |
| 2011/0032127 A1 | 2/2011 | Roush | |
| 2011/0056817 A1 | 3/2011 | Wu | |
| 2011/0056836 A1 | 3/2011 | Tatebe et al. | |
| 2011/0203912 A1 | 8/2011 | Niu et al. | |
| 2011/0205179 A1 | 8/2011 | Braun | |
| 2011/0261031 A1 | 10/2011 | Muto | |
| 2011/0267272 A1 | 11/2011 | Meyer et al. | |
| 2011/0284355 A1 | 11/2011 | Yang | |
| 2011/0303521 A1 | 12/2011 | Niu et al. | |
| 2012/0012446 A1 | 1/2012 | Hwa | |
| 2012/0032972 A1 | 2/2012 | Hwang | |
| 2012/0090973 A1 | 4/2012 | Liu | |
| 2012/0098751 A1 | 4/2012 | Liu | |
| 2012/0168294 A1 | 7/2012 | Pegg | |
| 2012/0193202 A1 | 8/2012 | Chen | |
| 2012/0286701 A1 | 11/2012 | Yang et al. | |
| 2012/0298496 A1 | 11/2012 | Zhang | |
| 2012/0313856 A1 | 12/2012 | Hsieh | |
| 2013/0023310 A1* | 1/2013 | Jung et al. | G06F 1/1624 455/566 |
| 2013/0043115 A1 | 2/2013 | Yang et al. | |
| 2013/0093500 A1 | 4/2013 | Bruwer | |
| 2013/0093733 A1 | 4/2013 | Yoshida | |
| 2013/0100030 A1 | 4/2013 | Los et al. | |
| 2013/0120265 A1 | 5/2013 | Horii et al. | |
| 2013/0162450 A1 | 6/2013 | Leong et al. | |
| 2013/0215079 A1 | 8/2013 | Johnson et al. | |
| 2013/0242601 A1 | 9/2013 | Kloeppel et al. | |
| 2013/0270090 A1 | 10/2013 | Lee | |
| 2014/0015777 A1 | 1/2014 | Park et al. | |
| 2014/0071654 A1 | 3/2014 | Chien | |
| 2014/0082490 A1 | 3/2014 | Jung et al. | |
| 2014/0090967 A1 | 4/2014 | Inagaki | |
| 2014/0098042 A1 | 4/2014 | Kuo et al. | |
| 2014/0116865 A1 | 5/2014 | Leong et al. | |
| 2014/0118264 A1 | 5/2014 | Leong et al. | |
| 2014/0151211 A1 | 6/2014 | Zhang | |
| 2014/0191973 A1 | 7/2014 | Zellers et al. | |
| 2014/0205814 A1* | 7/2014 | Hwang | B44C 1/1729 428/195.1 |
| 2014/0218851 A1 | 8/2014 | Klein et al. | |
| 2014/0251772 A1 | 9/2014 | Welch et al. | |
| 2014/0252881 A1 | 9/2014 | Dinh et al. | |
| 2014/0291133 A1 | 10/2014 | Fu et al. | |
| 2014/0320436 A1 | 10/2014 | Modarres et al. | |
| 2014/0346025 A1 | 11/2014 | Hendren et al. | |
| 2014/0375141 A1 | 12/2014 | Nakajima | |
| 2015/0010723 A1* | 1/2015 | Krishnan et al. | B23B 7/02 428/40.2 |
| 2015/0016038 A1 | 1/2015 | Niu et al. | |
| 2015/0083561 A1 | 3/2015 | Han et al. | |
| 2015/0090570 A1 | 4/2015 | Kwan et al. | |
| 2015/0090571 A1 | 4/2015 | Leong et al. | |
| 2015/0227207 A1 | 8/2015 | Winter et al. | |
| 2015/0243457 A1 | 8/2015 | Niu et al. | |
| 2015/0270073 A1 | 9/2015 | Yarak, III et al. | |
| 2015/0277559 A1 | 10/2015 | Vescovi et al. | |
| 2015/0287553 A1 | 10/2015 | Welch et al. | |
| 2015/0309538 A1 | 10/2015 | Zhang | |
| 2015/0332874 A1 | 11/2015 | Brock et al. | |
| 2015/0348726 A1 | 12/2015 | Hendren | |
| 2015/0378391 A1 | 12/2015 | Huitema et al. | |
| 2016/0049266 A1 | 2/2016 | Stringer et al. | |
| 2016/0093452 A1 | 3/2016 | Zercoe et al. | |
| 2016/0172129 A1 | 6/2016 | Zercoe et al. | |
| 2016/0189890 A1 | 6/2016 | Leong et al. | |
| 2016/0189891 A1 | 6/2016 | Zercoe et al. | |
| 2016/0259375 A1 | 9/2016 | Andre et al. | |
| 2016/0329166 A1 | 11/2016 | Hou et al. | |
| 2016/0336124 A1 | 11/2016 | Leong et al. | |
| 2016/0336127 A1 | 11/2016 | Leong et al. | |
| 2016/0336128 A1 | 11/2016 | Leong et al. | |
| 2016/0343523 A1 | 11/2016 | Hendren et al. | |

(56) References Cited

U.S. PATENT DOCUMENTS

| | | |
|---|---|---|
| 2016/0351360 A1 | 12/2016 | Knopf et al. |
| 2016/0365204 A1 | 12/2016 | Cao et al. |
| 2016/0378234 A1 | 12/2016 | Ligtenberg et al. |
| 2016/0379775 A1 | 12/2016 | Leong et al. |
| 2017/0004937 A1 | 1/2017 | Leong et al. |
| 2017/0004939 A1 | 1/2017 | Kwan et al. |
| 2017/0011869 A1 | 1/2017 | Knopf et al. |
| 2017/0090106 A1 | 3/2017 | Cao et al. |

FOREIGN PATENT DOCUMENTS

| | | |
|---|---|---|
| CN | 1533128 | 9/2004 |
| CN | 1542497 | 11/2004 |
| CN | 2672832 | 1/2005 |
| CN | 1624842 | 6/2005 |
| CN | 1812030 | 8/2006 |
| CN | 1838036 | 9/2006 |
| CN | 1855332 | 11/2006 |
| CN | 101051569 | 10/2007 |
| CN | 200961844 | 10/2007 |
| CN | 200986871 | 12/2007 |
| CN | 101146137 | 3/2008 |
| CN | 201054315 | 4/2008 |
| CN | 201084602 | 7/2008 |
| CN | 201123174 | 9/2008 |
| CN | 201149829 | 11/2008 |
| CN | 101315841 | 12/2008 |
| CN | 201210457 | 3/2009 |
| CN | 101465226 | 6/2009 |
| CN | 101494130 | 7/2009 |
| CN | 101502082 | 8/2009 |
| CN | 201298481 | 8/2009 |
| CN | 101546667 | 9/2009 |
| CN | 101572195 | 11/2009 |
| CN | 101800281 | 8/2010 |
| CN | 101807482 | 8/2010 |
| CN | 101868773 | 10/2010 |
| CN | 201655616 | 11/2010 |
| CN | 102110542 | 6/2011 |
| CN | 102119430 | 7/2011 |
| CN | 201904256 | 7/2011 |
| CN | 102163084 | 8/2011 |
| CN | 201927524 | 8/2011 |
| CN | 201945951 | 8/2011 |
| CN | 201945952 | 8/2011 |
| CN | 201956238 | 8/2011 |
| CN | 102197452 | 9/2011 |
| CN | 202008941 | 10/2011 |
| CN | 202040690 | 11/2011 |
| CN | 102280292 | 12/2011 |
| CN | 102338348 | 2/2012 |
| CN | 102375550 | 3/2012 |
| CN | 202205161 | 4/2012 |
| CN | 102496509 | 6/2012 |
| CN | 10269527 | 8/2012 |
| CN | 102622089 | 8/2012 |
| CN | 102629526 | 8/2012 |
| CN | 202372927 | 8/2012 |
| CN | 102679239 | 9/2012 |
| CN | 102683072 | 9/2012 |
| CN | 202434387 | 9/2012 |
| CN | 202523007 | 11/2012 |
| CN | 102832068 | 12/2012 |
| CN | 102955573 | 3/2013 |
| CN | 102956386 | 3/2013 |
| CN | 102969183 | 3/2013 |
| CN | 103000417 | 3/2013 |
| CN | 103165327 | 6/2013 |
| CN | 103180979 | 6/2013 |
| CN | 203012648 | 6/2013 |
| CN | 203135988 | 8/2013 |
| CN | 103377841 | 10/2013 |
| CN | 103489986 | 1/2014 |
| CN | 203414880 | 1/2014 |
| CN | 103681056 | 3/2014 |
| CN | 103699181 | 4/2014 |
| CN | 203520312 | 4/2014 |
| CN | 203588895 | 5/2014 |
| CN | 103839715 | 6/2014 |
| CN | 103839720 | 6/2014 |
| CN | 103839722 | 6/2014 |
| CN | 103903891 | 7/2014 |
| CN | 103956290 | 7/2014 |
| CN | 203733685 | 7/2014 |
| CN | 104021968 | 9/2014 |
| CN | 204102769 | 1/2015 |
| CN | 204117915 | 1/2015 |
| CN | 104517769 | 4/2015 |
| CN | 204632641 | 9/2015 |
| CN | 105097341 | 11/2015 |
| DE | 2530176 | 1/1977 |
| DE | 3002772 | 7/1981 |
| DE | 29704100 | 4/1997 |
| DE | 202008001970 | 8/2008 |
| EP | 0441993 | 8/1991 |
| EP | 1835272 | 9/2007 |
| EP | 1928008 | 6/2008 |
| EP | 2022606 | 6/2010 |
| EP | 2426688 | 3/2012 |
| EP | 2439760 | 4/2012 |
| EP | 2463798 | 6/2012 |
| EP | 2664979 | 11/2013 |
| FR | 2147420 | 3/1973 |
| FR | 2911000 | 7/2008 |
| FR | 2950193 | 3/2011 |
| GB | 1361459 | 7/1974 |
| JP | S50115562 | 9/1975 |
| JP | 59171414 A * | 9/1984 |
| JP | S60055477 | 3/1985 |
| JP | S61172422 | 10/1986 |
| JP | S62072429 | 4/1987 |
| JP | 62237618 A * | 10/1987 |
| JP | S63182024 | 11/1988 |
| JP | H0422024 | 4/1992 |
| JP | H0520963 | 1/1993 |
| JP | H0524512 | 8/1993 |
| JP | 05225850 A * | 9/1993 |
| JP | H05342944 | 12/1993 |
| JP | H09204148 | 8/1997 |
| JP | H10312726 | 11/1998 |
| JP | H11194882 | 7/1999 |
| JP | 2000010709 | 1/2000 |
| JP | 2000057871 | 2/2000 |
| JP | 2000339097 | 12/2000 |
| JP | 2001100889 | 4/2001 |
| JP | 2003114751 | 9/2001 |
| JP | 2002260478 | 9/2002 |
| JP | 2002298689 | 10/2002 |
| JP | 2003522998 | 7/2003 |
| JP | 2005108041 | 4/2005 |
| JP | 2006164929 | 6/2006 |
| JP | 2006185906 | 7/2006 |
| JP | 2006521664 | 9/2006 |
| JP | 2006269439 | 10/2006 |
| JP | 2006277013 | 10/2006 |
| JP | 2006344609 | 12/2006 |
| JP | 2007115633 | 5/2007 |
| JP | 2007514247 | 5/2007 |
| JP | 2007156983 | 6/2007 |
| JP | 2008021428 | 1/2008 |
| JP | 2008041431 | 2/2008 |
| JP | 2008100129 | 5/2008 |
| JP | 2008191850 | 8/2008 |
| JP | 2008533559 | 8/2008 |
| JP | 2008293922 | 12/2008 |
| JP | 2009099503 | 5/2009 |
| JP | 2009181894 | 8/2009 |
| JP | 2010061956 | 3/2010 |
| JP | 2010244088 | 10/2010 |
| JP | 2010244302 | 10/2010 |
| JP | 2011018484 | 1/2011 |
| JP | 2011065126 | 3/2011 |
| JP | 2011150804 | 8/2011 |
| JP | 2011165630 | 8/2011 |

(56) References Cited

FOREIGN PATENT DOCUMENTS

| | | |
|---|---|---|
| JP | 2011524066 | 8/2011 |
| JP | 2011187297 | 9/2011 |
| JP | 2012022473 | 2/2012 |
| JP | 2012043705 | 3/2012 |
| JP | 2012063630 | 3/2012 |
| JP | 2012098873 | 5/2012 |
| JP | 2012134064 | 7/2012 |
| JP | 2012186067 | 9/2012 |
| JP | 2012230256 | 11/2012 |
| JP | 2014017179 | 1/2014 |
| JP | 2014026807 | 2/2014 |
| JP | 2014216190 | 11/2014 |
| JP | 2014220039 | 11/2014 |
| JP | 2016053778 | 4/2016 |
| KR | 1019990007394 | 1/1999 |
| KR | 1020020001668 | 1/2002 |
| KR | 100454203 | 10/2004 |
| KR | 1020060083032 | 7/2006 |
| KR | 1020080064116 | 7/2008 |
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 | 3/2015 |
| TW | 200703396 | 1/2007 |
| TW | M334397 | 6/2008 |
| TW | 201108284 | 3/2011 |
| TW | 201108286 | 3/2011 |
| TW | M407429 | 7/2011 |
| TW | 201246251 | 11/2012 |
| TW | 201403646 | 1/2014 |
| WO | WO9744946 | 11/1997 |
| WO | WO2005/057320 | 6/2005 |
| WO | WO2006/022313 | 3/2006 |
| WO | WO2007/049253 | 5/2007 |
| WO | WO2008/045833 | 4/2008 |
| WO | WO2009/005026 | 1/2009 |
| WO | WO2012/011282 | 1/2012 |
| WO | WO2012/027978 | 3/2012 |
| WO | WO2013/096478 | 6/2013 |
| WO | WO2014175446 | 10/2014 |

\* cited by examiner

ELECTRONIC DEVICE WITH A REDUCED FRICTION SURFACE

CROSS-REFERENCE TO RELATED APPLICATION

This application claims the benefit under 35 U.S.C. § 119(e) of U.S. Provisional Patent Application No. 61/844,833, filed Jul. 10, 2013, entitled "Electronic Device with a Reduced Friction Surface," the entirety of which is incorporated herein by reference as if fully disclosed herein.

TECHNICAL FIELD

The present invention relates to electronic devices, and more particularly to an electronic device with one or more reduced friction surfaces.

BACKGROUND

Users interact with electronic devices, such as laptops, tablet computing devices, and smart telephones in a variety of ways. A user can view images on a display or input information using a touchscreen, keyboard, or buttons. The surfaces of the components in an electronic device, as well as the surface of the electronic device itself, can enhance the user experience by providing a tactile reduced friction surface that has a desired look or feel. However, mass manufacturing of the components that include the reduced friction surface can be difficult due to the presence of a cosmetic surface and/or display elements, such as symbols or glyphs. For example, machining around the full perimeter of a component may not be feasible when performed at mass manufacturing quantities. Additionally, positioning the transition between the surface of the component and the edges of the reduced friction surface in a non-visible location can be challenging depending on the design of the component. The transition can produce a noticeable and undesirable color change. The transition may also be detected by a user when the user touches or slides a finger over the surface.

SUMMARY

In one aspect, a surface of an electronic device includes a reduced friction surface comprising a glass beaded film. The reduced friction surface is disposed over at least one surface of the electronic device or of a component. The reduced friction surface includes glass beads embedded or bonded in a polymer layer. A thermoplastic elastomer layer can be under the polymer layer. A portion of the glass beads protrude from the surface of the polymer layer and provide a hardness to the glass beaded film. The polymer layer provides a flexibility or elasticity to the glass beaded film.

In another aspect, a method for producing the reduced friction surface over one or more surfaces of an electronic device includes providing a conformal glass beaded film and pressing the at least one surface into the conformal glass beaded film to dispose the glass beaded film over the at least one surface. In one embodiment, the glass beaded film is heated to a temperature that is greater than its forming temperature, which causes the glass beaded film to be pliable and conformal when formed over the at least one surface.

In another aspect, a method for producing the reduced friction surface on one or more surfaces of an electronic device includes providing a mold of the at least one surface, where the mold is made of the glass beaded film, and filling the mold with a material that becomes the at least one surface. For example, an insert molding process can be performed to inject the surface material into the glass beaded film mold.

In yet another aspect, a method for producing the reduced friction surface on one or more surfaces of an electronic device includes positioning the electronic device in a lower mold, positioning a glass beaded film over the lower mold, and heating the glass beaded film, the component and the glass beaded film, or the electronic device and the glass beaded film. An upper mold is then positioned over the lower mold and a pressure difference is created between the upper and lower molds to overlay the glass beaded film on the at least one surface of the electronic device.

In another aspect, a method for producing the reduced friction surface on one or more surfaces of an electronic device includes adhering the glass beaded film to the at least one surface and removing the polymer layer. The glass beaded film can be affixed to the at least one surface with an adhesive layer that is disposed over the portions of the glass beads protruding from the polymer layer. The glass beaded film can be heated prior to removing the polymer layer.

And in yet another aspect, a keyboard includes at least one key mechanism having a keycap and a glass beaded film disposed over the top surface of the keycap. The glass beaded film may also be disposed over at least a portion of the sides of the keycap. The glass beaded film includes glass beads disposed in a layer such that a portion of the glass beads protrude from a surface of the layer. The layer can be a polymer layer or an adhesive layer.

BRIEF DESCRIPTION OF THE DRAWINGS

Embodiments are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein can provide a reduced friction surface for one or more surfaces of an electronic device or for one or more components in an electronic device. The surface can include the enclosure of an electronic device, a button, one or more keycaps in a keyboard, and other types of input devices. The reduced friction surface includes a glass beaded film that positions or affixes glass or glass-like beads in a polymer or resin layer. The glass or glass-like beads can protrude from the surface of the polymer layer. The glass or glass-like beads provide a hardness to the reduced friction surface while the polymer layer provides a flexibility or elasticity to the reduced friction surface. The reduced friction surface may have an increased abrasion resistance as compared to other surfaces. Additionally, the reduced friction surface may provide an improved user experienced with the electronic device as the tactile feel of the reduced friction surface may be preferred as compared to other surfaces. Moreover, the reduced friction surface may also provide an improved cosmetic appearance for the electronic device.

In some embodiments, the reduced friction surface is applied to one or more surfaces to avoid the need to position a transition between the reduced friction surface and the surface of the electronic device in a blind or non-visible area. For example, the reduced friction surface overlies a top surface and all four sides of a keycap when the reduced friction surface is applied to one or more keycaps of a keyboard. Various methods are described herein that can be used to dispose the glass beaded film to one or more surfaces of an electronic device.

Figure 1:
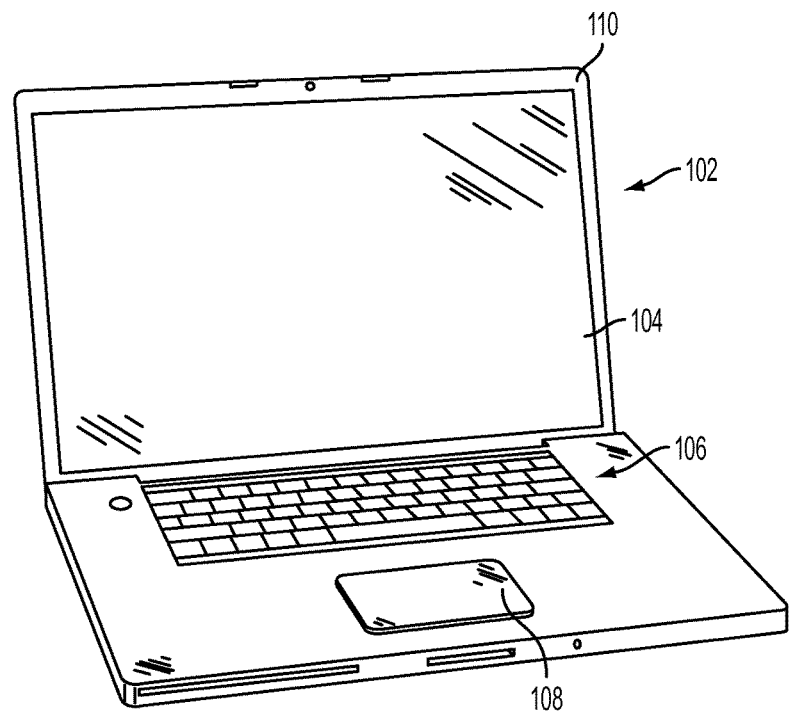
FIGS. 1 and 2 illustrate example electronic devices that can include one or more reduced friction surfaces.

Referring now to FIG. 1, there is shown a front perspective view of an example electronic device that can include one or more reduced friction surfaces. As shown in FIG. 1, the electronic device 102 can be a laptop or netbook computer that includes a display 104, a keyboard 106, and an input device 108, shown in the illustrated embodiment as a trackpad. An enclosure 110 can form an outer surface or partial outer surface and protective case for the internal components of the electronic device 102, and may at least partially surround the display 104, the keyboard 106, and the trackpad 108. The enclosure 110 can be formed of one or more components operably connected together, such as a front piece and a back piece.

The display is configured to display a visual output for the electronic device 102. The display 104 can be implemented with any suitable display, including, but not limited to, a liquid crystal display (LCD), an organic light-emitting display (OLED), or organic electro-luminescence (OEL) display.

The keyboard 106 includes multiple keys or key mechanisms that a user can use to interact with an application running on the electronic device 102. Example applications include a game, a word processing application, and a spreadsheet application. The key mechanisms can be configured in any arrangement, such as a QWERTY keyboard, and can include additional key mechanisms that provide control or operational inputs such as home, ESC, ALT, page up, page down, and function keys.

The trackpad 108 can be used to interact with one or more viewable objects on the display 104. For example, the trackpad 108 can be used to move a cursor or to select a file or program (represented by an icon) shown on the display. The trackpad 108 can use any known touch sensing technologies, including capacitive, resistive, ultrasonic, and piezoelectric touch sensing technologies.

In some embodiments, one or more surfaces of some or all of the keys in the keyboard can include a reduced friction surface. Additionally or alternatively, at least a portion of the exterior surface of the enclosure can include a reduced friction surface. The reduced friction surface will be described in more detail in conjunction with FIG. 5.

Figure 2:
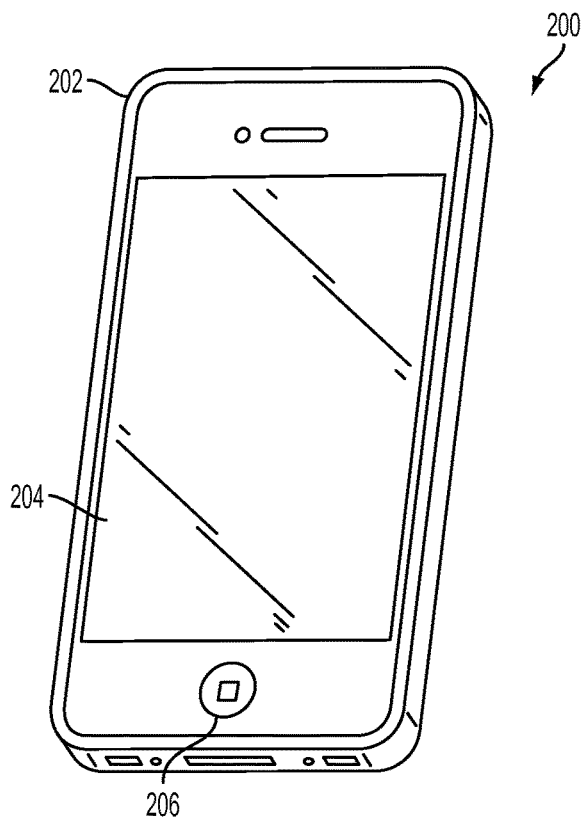

FIG. 2 is a front view of another example electronic device that can include one or more reduced friction surfaces. In the illustrated embodiment, the electronic device 200 is a smart telephone that includes an enclosure 202 surrounding a display 204 and one or more buttons 206 or input devices. The enclosure 202 can be similar to the enclosure described in conjunction with FIG. 1, but may vary in form factor and function.

The display 204 can be implemented with any suitable display, including, but not limited to, a multi-touch capacitive sensing touchscreen that uses liquid crystal display (LCD) technology, organic light-emitting display (OLED) technology, or organic electro luminescence (OEL) technology. Touch sensing technologies other than capacitive can be used in other embodiments.

The button 206 can take the form of a home button, which may be a mechanical button, a soft button (e.g., a button that does not physically move but still accepts inputs), an icon or image on a display, and so on. Further, in some embodiments, the button 206 can be integrated as part of a cover glass of the electronic device.

Like the embodiment shown in FIG. 1, at least a portion of the exterior surface of the enclosure 202 can include a reduced friction surface. Additionally or alternatively, the surface of one or more buttons, such as button 206, can include a reduced friction surface.

A keycap is the component of a key or key mechanism in a keyboard that a user touches or presses when interacting with the keyboard. Example keycaps are used to describe the reduced friction surface and techniques for producing the reduced friction surface on the keycap. However, as described earlier, the reduced friction surface and fabrication techniques can be used on other types of electronic devices or components of an electronic device. As one example, the reduced friction surface can be included on at least a portion of an enclosure or on a button. The term "electronic device" as used herein is meant to be generic and encompass an electronic device and components in, connected to (wirelessly or wired), or operable with an electronic device.

Figure 3:
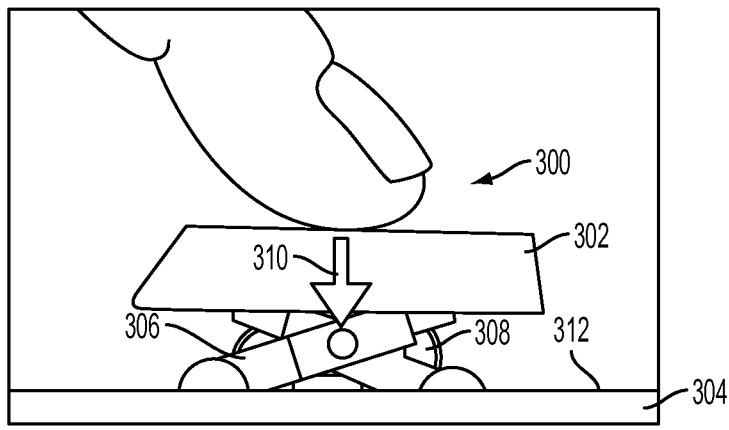
FIG. 3 depicts one example of a key mechanism of a keyboard.

Referring now to FIG. 3, there is shown one example of a key mechanism of a keyboard. The key mechanism 300 includes a keycap 302 that is attached to a base plate 304 via a scissor mechanism 306. The base plate 304 can be a printed circuit board, a flexible circuit, or a structural member of a keyboard. The scissor mechanism 306 includes two pieces that interlock in a "scissor"-like manner, as shown in FIG. 3. The scissor mechanism 306 is typically formed out of a rigid material, such as a plastic, metal, or composite material, and provides mechanical stability to the key mechanism 300.

A deformable structure 308 along with the scissor mechanism 306 support the keycap 302. In the illustrated embodiment, the deformable structure 308 is an elastomeric dome, such as a rubber dome. When the keycap 302 is pressed down by a user in the direction of arrow 310, the keycap contacts the deformable structure 308, which in turn causes the deformable structure 308 to compress or collapse. When the deformable structure 308 compresses or collapses, the deformable structure 308 contacts a membrane 312, which activates a switch and provides an input to the electronic device.

Other embodiments can construct a key mechanism differently. By way of example only, a key mechanism can include a stacked metal and elastomeric dome, with a keycap positioned over the stacked elastomeric and metal dome. When a user depresses the keycap, the elastomeric dome depresses the metal dome to activate the switch. One example of this type of key mechanism is disclosed in United States Patent Application Publication 2011/0203912.

Figure 4:
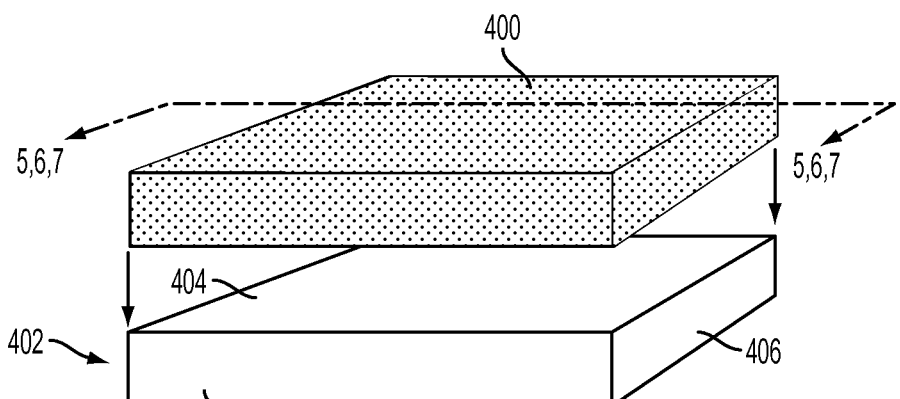
FIG. 4 illustrates one example of a keycap that includes a reduced friction surface.

At least one surface of the keycap can include a reduced friction surface. For example, the reduced friction surface can be disposed over the top surface of the keycap. Alternatively, the reduced friction surface can be formed over the top and at least a portion of the four sides of the keycap. FIG. 4 illustrates one example of a keycap that includes a reduced friction surface. For clarity, the reduced friction surface 400 is shown detached from the keycap 402. The reduced friction surface 400 is disposed over and affixed to the top surface 404 of the keycap 402 and some or all of the sides 406 of the keycap 402. The amount of reduced friction surface 400 used over the sides 406 can depend on how much of the sides is visible to a user. In some embodiments, the reduced friction surface 400 completely covers all four sides of the keycap.

Figure 5:
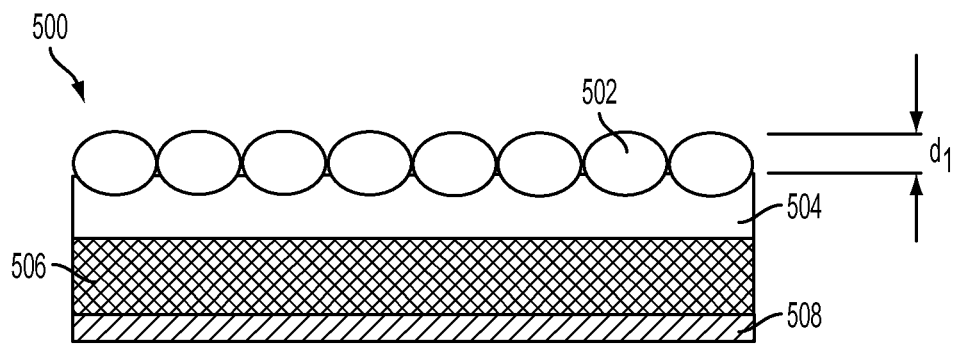
FIGS. 5-7 depict cross-section views of example reduced friction surface materials taken along line 5,6,7-5,6,7 in FIG. 4.
Figure 6:
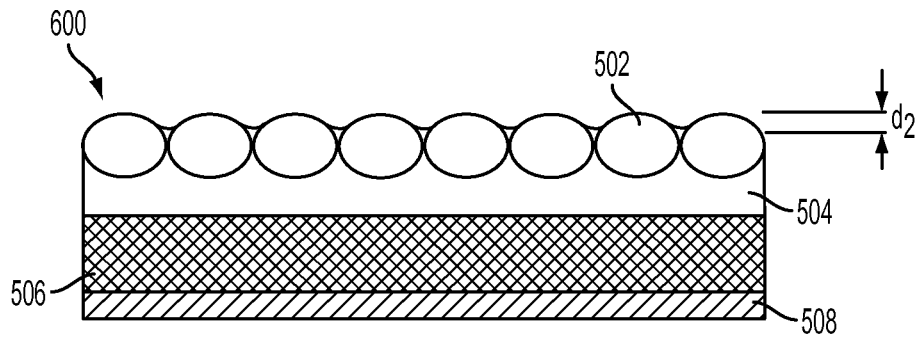
Figure 7:
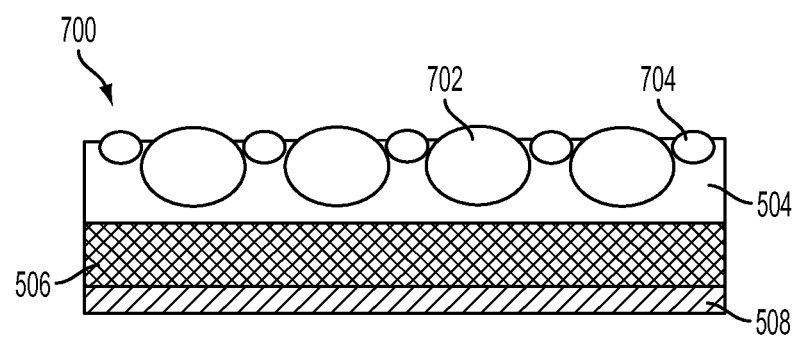

FIGS. 5-7 depict cross-section views of example reduced friction surface materials taken along line 5,6,7-5,6,7 in FIG. 4. In the embodiment shown in FIG. 5, the reduced friction surface includes a glass beaded film 500. As used herein, the phrases "glass beads" and "glass beaded" are meant to be generic and encompass glass and glass-like beads. The glass beaded film 500 can be a clear or light transmissive film. The glass beaded film 500 includes glass beads 502 disposed in a resin or polymer layer 504. In one embodiment, the polymer is polyurethane or PU composite and the glass beads are borosilicate beads. The glass beads 502 provide a surface that a user touches with one or more fingers when touching or interacting with a key mechanism of a keyboard.

The polymer layer 504 can be formed over a thermoplastic elastomer (TPE) layer 506. Any suitable thermoplastic elastomer material can be used, including, but not limited to a polycarbonate (PC), a PET or PETG, and an amorphous PA. An adhesive layer 508 can be disposed under the elastomeric layer 506. The adhesive layer 508 can be used to attach or affix the glass beaded film 500 to a surface.

The glass beads 502 in the glass beaded film 500 can be embedded or bonded at any depth within the polymer layer 504. For example, the glass beads 502 in FIG. 5 have a low bead sink, meaning the glass beads 502 are positioned at a lower depth in the polymer layer 504 so that a greater portion of the glass beads 502 protrude from the polymer layer 504. In the illustrated embodiment, the glass beads 502 project out a distance d1 from the surface of the polymer layer 504. When positioned at a lower depth within the polymer layer 504, the glass beads 502 can provide a greater tactile feedback to a user when a user touches or moves a finger, fingers, palm, or hand on or over the surface of the glass beaded film 500.

In one embodiment, the glass beads 502 are contiguous within the polymer layer 504 and the exposed top surfaces of the glass beads 502 line up to form a common plane on the surface of the glass beaded film 500. The surfaces of the glass beads can feel to a user like a single continuous surface. When the top surfaces of glass beads form a common plane, the glass beaded film 500 can have a low coefficient of friction that allows a user's finger to move or slide more easily on or over the surface. A user may not feel the individual glass beads when the glass beads 502 are arranged in this manner. In other embodiments, the glass beads 502 are not contiguous and can be in a spaced-apart configuration. Additionally or alternatively, the glass beads 502 may not line up to form a common plane but instead can produce a varied surface on the glass beaded film 500.

In FIG. 6, the glass beads 502 have a high bead sink, meaning the glass beads 502 are positioned at a greater depth in the polymer layer 504 so that a smaller portion of the glass beads 502 protrude from the polymer layer 504. As shown in FIG. 6, the glass beads 502 project out a distance d2 from the surface of the polymer layer 504. The distance d2 is less than the distance d1 in FIG. 5. At a higher bead sink, the glass beads 502 may provide a user with a reduced tactile experience compared to a lower bead sink.

Glass beads having varying diameters are included in the glass beaded film 700 shown in FIG. 7. One size of glass beads 702 having a larger diameter is intermingled with another size of glass beads 704 having a smaller diameter than the diameter of glass beads 702. The different sized glass beads 702, 704 can allow the density of the glass beads in the polymer layer 504 to be greater than when only one size of glass beads are used. The larger and smaller sized glass beads can alternate with respect to each other in the polymer layer 504 in some embodiments. In other embodiments, the glass beads 702, 704 can have any given distribution within the polymer layer 504. Additionally, both sizes of glass beads can be embedded or bonded at appropriate depths so that the top surfaces of the glass beads line up to form a common plane. Alternatively, one size of glass beads can be fixed at a first depth within the polymer layer 504 while the other size of glass beads are fixed at a different second depth, or the glass beads can be fixed at varying depths within the polymer layer 504.

The glass beads can have any suitable diameter or diameters. By way of example only, the glass beads can have a diameter of 5 microns to 100 microns. In some embodiments, the glass beads have a diameter of 50 microns.

Figure 8:
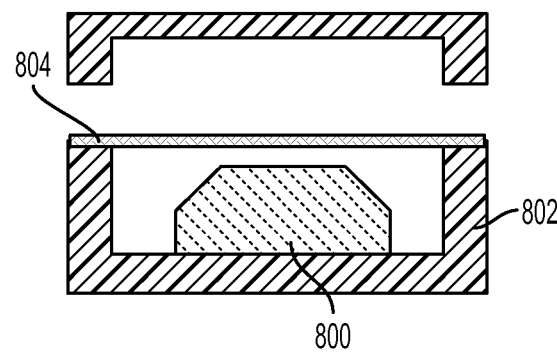
FIGS. 8-10 illustrate one method for producing a reduced friction surface over at least one surface of a keycap.
Figure 9:
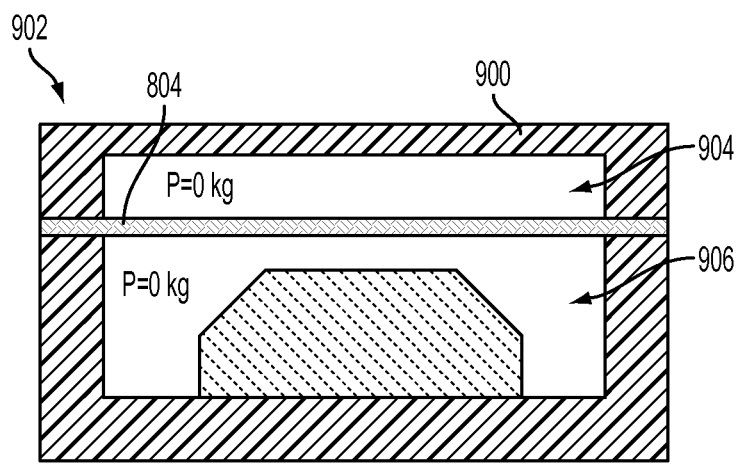
Figure 10:
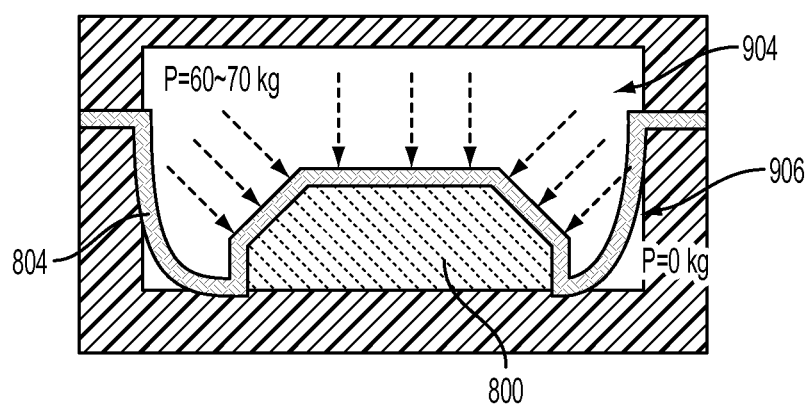

Referring now to FIGS. 8-10, there is shown one example method for forming a reduced friction surface over one or more surfaces of a keycap. The illustrated method is a thermoforming method. Although only one keycap and mold is shown, those skilled in the art will recognize that the method can be performed on multiple keycaps at one time.

The keycap 800 is disposed in a lower mold 802 with the glass beaded film 804 overlying the lower mold (FIG. 8). Heat is then applied to the glass beaded film 804 to produce a pliable and conformal glass beaded film. In one embodiment, the glass beaded film is heated to a temperature that is over the film's forming temperature. Next, the upper mold 900 is joined to the lower mold 802 to seal the mold 902 and the air extracted from the upper and lower areas 904, 906 of the mold 902 (FIG. 9). For example, in the illustrated embodiment, the glass beaded film 804 defines upper and lower areas 904, 906 of the mold 902, and the pressure in both the upper and lower areas 904, 906 is zero.

The pressure in the upper area 904 is then increased compared to the lower area 906, which causes the glass beaded film 804 to attach and conform to the keycap 800 (FIG. 10). In the illustrated embodiment, the pressure in the upper area 904 is 60 to 70 kg and the pressure in the lower area 906 is 0 kg. Other embodiments can set the different pressure levels to different values.

The keycap 800 can now be removed from the mold. The glass beaded film 804 attaches to the top surface and all four sides of the keycap in some embodiments, which reduces or eliminates the need to position the transition between the reduced friction surface and the surface of the keycap in a blind or non-visible area.

Figure 11:
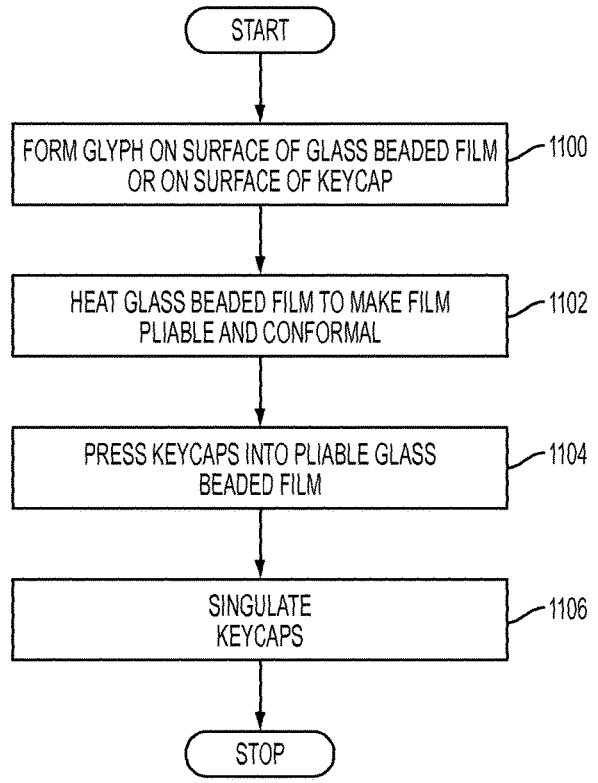
FIG. 11 is a flowchart of another method for producing a reduced friction surface over at least one surface of a keycap.

FIG. 11 is a flowchart of another method for producing a reduced friction surface over at least one surface of a keycap. Initially, one or more glyphs can be formed on a surface of the glass beaded film (block 1100). A glyph can be any character, number, symbol, phrase, or combinations of such elements. By way of example only, a glyph can include a letter or number of a standard QWERTY keyboard. In one embodiment, the glyph is formed on a backside surface of the glass beaded film with a suitable dye or ink. Other embodiments can form the glyph or glyphs on the keycap or on a different surface or location of the glass beaded film.

Figure 12:
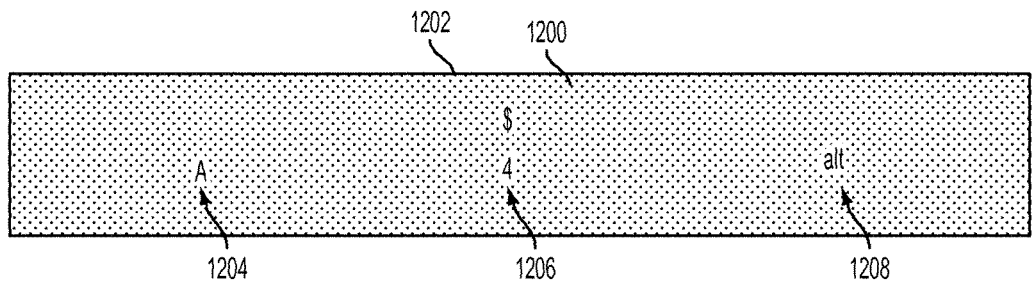
FIG. 12 depicts block 1100 in FIG. 11.

FIG. 12 depicts block 1100 in FIG. 11. As described earlier, the backside surface 1200 of the glass beaded film 1202 is the side that contacts the surface of the keycap. Example glyphs 1204, 1206, 1208 for three keycaps are shown in the figure. The glyphs can be positioned at any location on the surface. In the illustrated embodiment, the example glyphs 1204, 1206, 1208 are arranged to appear on the top surface of each keycap.

Figure 13:
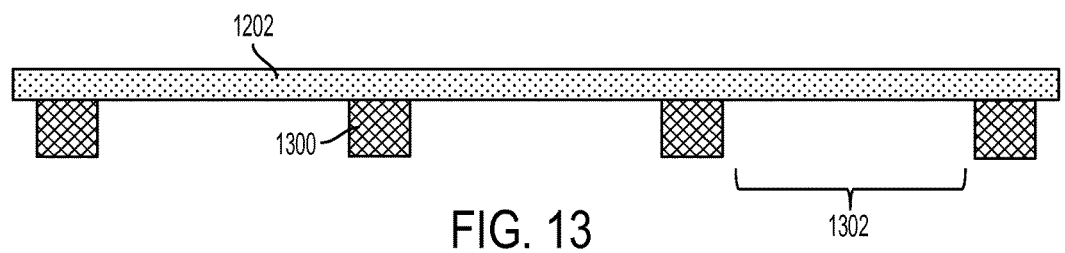
FIG. 13 illustrates block 1102 in FIG. 11.
Figure 14:
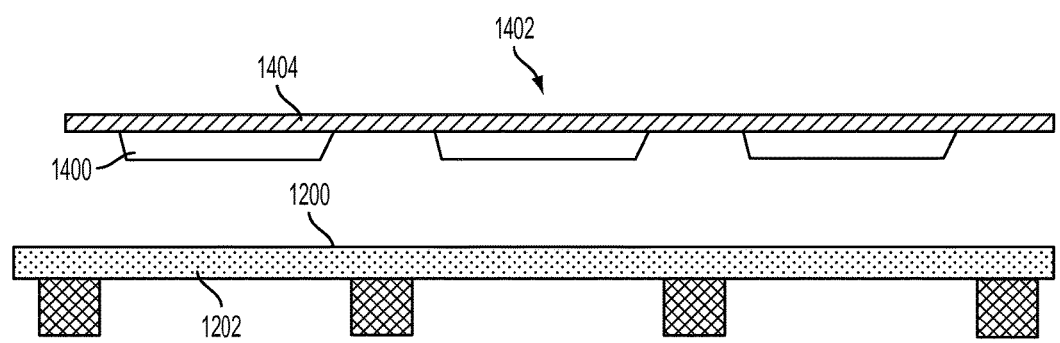
FIGS. 14-15 depict block 1104 in FIG. 11.
Figure 15:
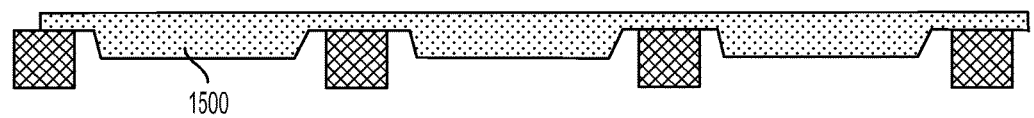

Next, as shown in block 1102, the glass beaded film is heated to produce a pliable and conformal glass beaded film. As described earlier, the glass beaded film can be heated to a temperature that is greater than the forming temperature. The glass beaded film 1202 can be placed on a fixture 1300 that includes openings 1302 (see FIG. 13). The keycaps 1400 are then pressed or pushed downward (as indicated by arrow 1402) into the pliable and conformal glass beaded film 1202, as shown in block 1104 and in FIGS. 14 and 15.

Figure 16:
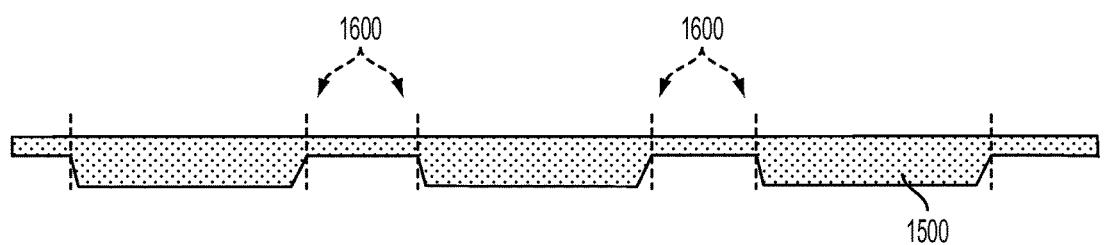
FIG. 16 illustrates block 1106 in FIG. 11.

The keycaps 1400 can be mounted on a key fixture 1404 for proper orientation. The pliable and conformal glass beaded film 1202 wraps around and attaches to the top surface of the keycaps all four sides in the illustrated embodiment. The glass beaded film and the keycap form an integrated or consolidated component. FIG. 16 illustrates the keycaps within the glass beaded film 1500. The bottom surface of the keycap may or may not be covered by the glass beaded film.

Figure 17:
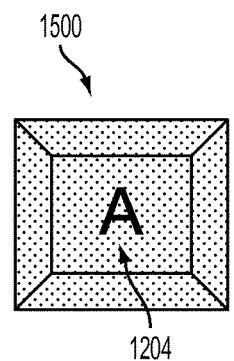
FIG. 17 depicts a keycap after performing block 1106 in FIG. 11.

The key fixture 1404 is then removed and the keycaps 1500 are singulated or separated into individual keycaps (block 1106). For example, a cutting tool can be used to separate the keycaps 1500 along lines 1600 in FIG. 16. FIG. 17 illustrates an individual keycap 1500 after separation. The glyph 1204 (FIG. 12) is visible on the top surface of the keycap 1500.

Figure 18:
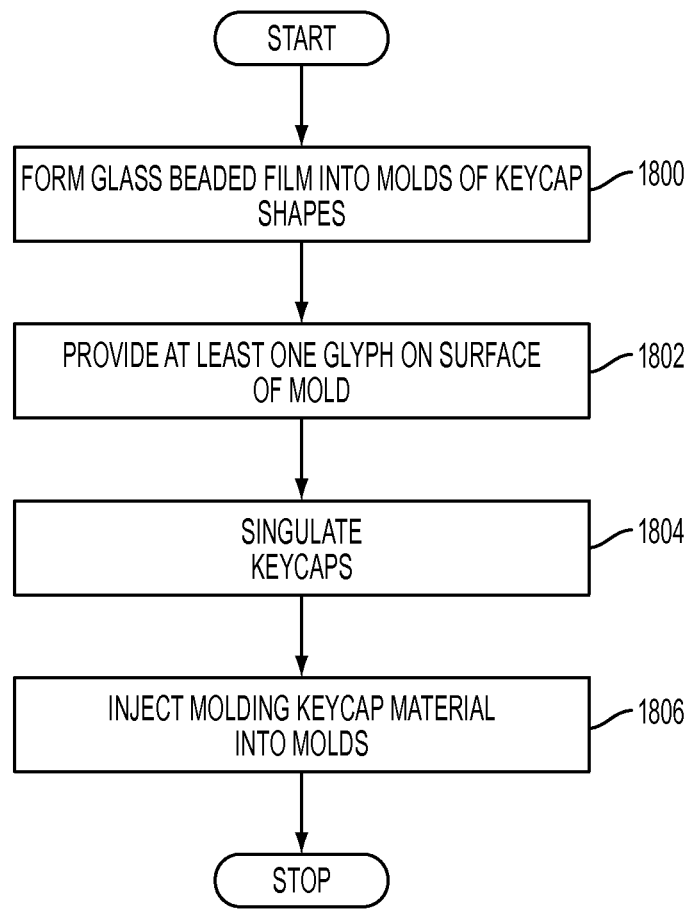
FIG. 18 is a flowchart of another method for producing a reduced friction surface on one or more surfaces of a keycap.
Figure 19:
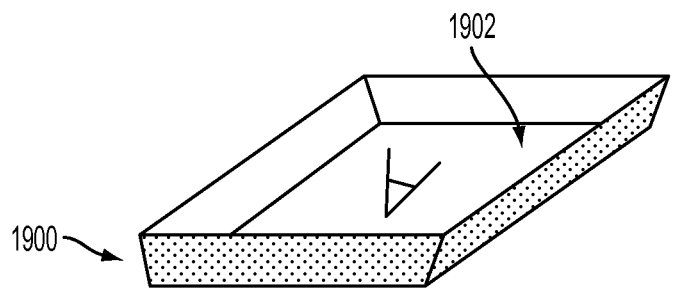
FIG. 19 illustrates block 1800 in FIG. 18.

Referring now to FIG. 18, there is shown a flowchart of another method for producing a reduced friction surface on one or more surfaces of a keycap. Initially, the glass beaded film is formed into a mold having the shape of the surface or surfaces of the keycap the film will overlie (block 1800). FIG. 19 depicts one example of a keycap mold 1900 formed by the glass beaded film. The glass beaded film molds can be produced, for example, using a method similar to the process shown in FIG. 14. In this process, the keycaps are removed from the glass beaded film after the keycaps have been pressed into the glass beaded film.

One or more glyphs can be formed on at least one surface of the glass beaded film mold at block 1802. By way of example only, the one or more glyphs can be provided on the inside surface 1902 (FIG. 19) of the mold. In other embodiments, the glyph or glyphs can be formed on at least one surface of the keycap.

Figure 20:
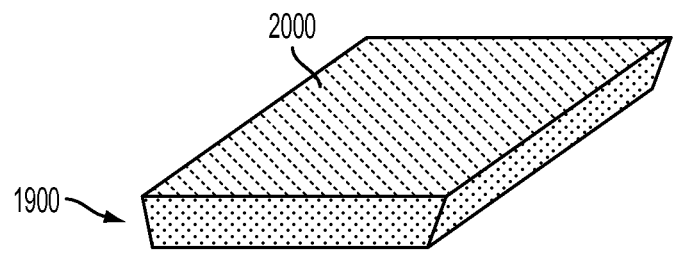
FIG. 20 depicts block 1802 in FIG. 18.

Next, as shown in block 1804, the keycaps can be singulated or separated into individual keycaps. Insert molding is then performed at block 1806 to inject the keycap material into the glass beaded film mold. FIG. 20 illustrates the glass beaded film mold 1900 filled with keycap material 2000.

Figure 21:
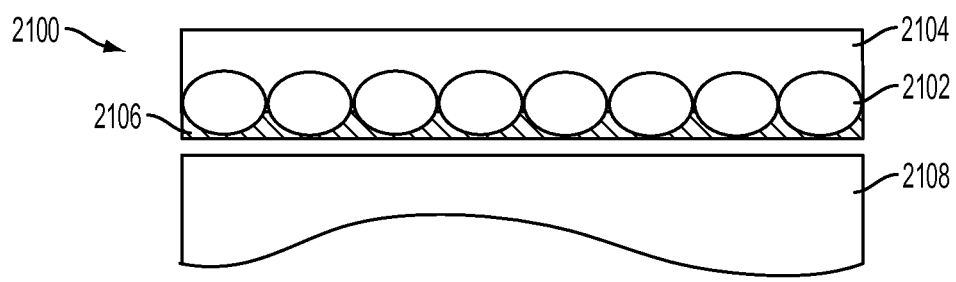
FIGS. 21-22 illustrate another method for producing a reduced friction surface on one or more surfaces of a keycap.
Figure 22:
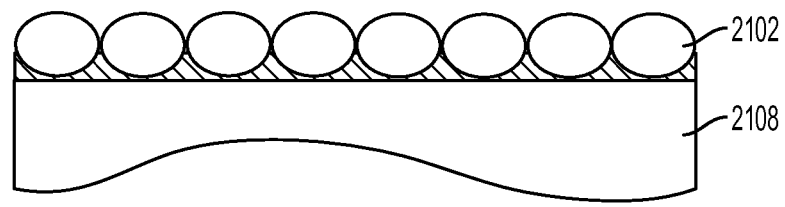

FIGS. 21-22 illustrate another method for producing a reduced friction surface on one or more surfaces of a keycap. As shown in FIG. 21, a glass beaded film 2100 can include glass beads 2102 embedded or bonded in a polymer layer 2104. An adhesive layer 2106 can be formed over the exposed surfaces of the glass beads 2102. The glass beaded film 2100 can be heated and then pressed down onto at least one surface of a keycap 2108 and the polymer layer 2104 removed (FIG. 22). For example, the polymer layer 2104 can be pulled off when the glass beaded film 2100 is still pliable and conformal, leaving the glass beads 2102 affixed to one or more surfaces of the keycap 2108. Alternatively, the polymer layer 2104 can be peeled off once the glass beads 2102 are affixed to the keycap 2108, regardless of the pliability of the glass beaded film 2100.

Figure 23:
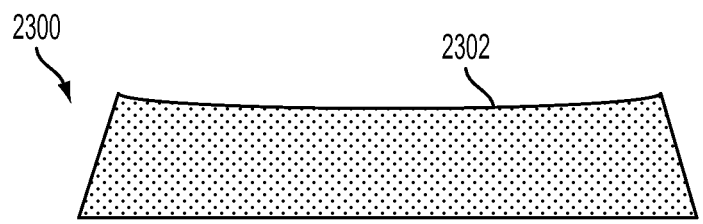
FIGS. 23-24 illustrate example keycap shapes.
Figure 24:
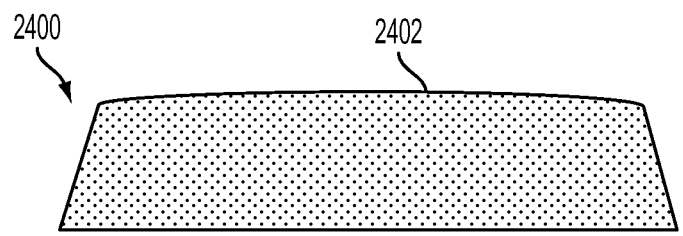

FIGS. 23-24 illustrate example keycap shapes. The keycaps can have any given shape, geometry, and/or dimensions. For example, in a QWERTY keyboard the alphanumeric keys typically have one shape and dimensions while other keys, such as the shift and spacebar keys, have different dimensions. The function keys in a computer keyboard can have yet another size and dimensions.

Additionally, one or more surfaces of keycaps can be formed to have varied shapes. For example, the keycap 2300 in FIG. 23 includes a concave top surface 2302 while the keycap 2400 in FIG. 24 has a convex top surface 2204. Other examples of surface features can include beveled, chamfer, rounded, and recessed. One or more techniques described herein can be used to overlay the keycaps with the glass beaded film, despite the shapes, geometries, and/or dimensions of the keycaps.

In some embodiments, the glass beaded film can be a light transmissive film, such as a high transmissive film. The exposed surfaces of the glass beads can be coated with any suitable material to repel contaminants such as dirt, oil, and water. The refractive index of the glass beads can match or substantially match the refractive index of the polymer layer to produce a transparent look. The number of glass beads, the material of the glass beads, and/or the bead sink can be determined based on the surface type, the desired look and feel, the intended use of the electronic device or component in the electronic device, and/or the desired durability of the reduced friction surface.

Various embodiments have been described in detail with particular reference to certain features thereof, but it will be understood that variations and modifications can be effected within the spirit and scope of the disclosure. For example, block 1100 or block 1802 are optional and can be omitted in other embodiments. Additionally, as described earlier, the reduced friction surface can be disposed over one or more surfaces of other electronic devices. By way of example only, the surface can be all or some of the enclosure of a tablet computing device, a laptop, and a smart telephone, a button, or another type of input device.

Even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A method for producing at least one reduced friction surface on a keycap, the method comprising:
    pushing the keycap into a glass beaded film that is heated to form a conformal glass beaded film, thereby conforming the conformal glass beaded film to a top surface and at least one side surface of the keycap, wherein the conformal glass beaded film comprises glass beads disposed in a polymer layer such that a portion of the glass beads protrude from a surface of the polymer layer.

2. The method as in claim 1, further comprising:
    mounting the glass beaded film on a fixture; and
    heating the glass beaded film to form the conformal glass beaded film.

3. The method as in claim 2, further comprising providing positioning at least one glyph on a surface of the glass beaded film prior to heating the glass beaded film.

4. The method as in claim 2, further comprising positioning at least one glyph on the top surface of the keycap prior to heating the glass beaded film.

5. The method as in claim 1, further comprising pushing at least one additional keycap into the conformal glass beaded film wherein the keycap and the at least one additional keycap are coupled to a fixture.

6. The method as in claim 5, further comprising singulating the plurality of keycaps from the fixture after pushing the plurality of keycaps into the conformal glass beaded film.

7. The method as in claim 1, wherein pushing the keycap into the conformal glass beaded film adheres the glass beaded film to the keycap.

8. The method as in claim 1, wherein the glass beaded film further comprises a thermoplastic elastomer under the polymer layer.

9. A method for producing a reduced friction surface on a plurality of keycaps, comprising:
    forming a plurality of glyphs on a glass beaded film;
    heating the glass beaded film, thereby forming a heated glass beaded film;
    aligning a plurality of keycaps coupled to a keycap fixture with respective glyphs on the glass beaded film;
    while the glass beaded film is heated, pushing the plurality of keycaps, via the keycap fixture into the glass beaded film, thereby disposing the glass beaded film on top and side surfaces of the plurality of keycaps; and
    singulating the plurality of keycaps from the keycap fixture.

10. The method of claim 9, wherein:
    the operation of forming the plurality of glyphs comprises forming the plurality of glyphs on a first surface of the glass beaded film; and
    a second surface of the glass beaded film opposite the first surface defines interface surfaces of the plurality of keycaps.

11. The method of claim 10, wherein:
    forming the plurality of glyphs comprises depositing a dye on a polymer layer of the glass beaded film.

12. The method of claim 9, further comprising prior to heating the glass beaded film mounting the glass beaded film to a film fixture defining a plurality of openings.

13. The method of claim 12, wherein pushing the plurality of keycaps into the glass beaded film comprises pushing the plurality of keycaps into the glass beaded film such that the keycaps extend into respective openings of the plurality of openings.

14. A method comprising:
    heating a film comprising glass beads extending at least partially beyond a surface of a polymer material thereby causing the film to become pliable; and
    while the film is heated, conforming the film to top and side surfaces of each of a plurality of keycaps, wherein the film is conformed to the plurality of keycaps substantially simultaneously.

15. The method of claim 14, wherein the operation of conforming the film to the top and side surfaces of each of the plurality of keycaps comprises pressing the plurality of keycaps against the film.

16. The method of claim 15, wherein the operation of conforming the film to the top and side surfaces of each of the plurality of keycaps attaches the film to the plurality of keycaps.

17. The method of claim 14, further comprising depositing an ink on a surface of the glass beaded film to form a plurality of glyphs on the surface.

18. The method of claim 14, wherein conforming the film to the top and side surfaces of each of the plurality of keycaps attaches the film to the top and side surfaces of each of the plurality of keycaps.

19. The method of claim 14, wherein:
    the plurality of keycaps are coupled to a fixture; and
    conforming the film to the top and side surfaces of each of the plurality of keycaps comprises pressing the plurality of keycaps into the film via the fixture.

20. The method of claim 19, further comprising after conforming the film to the top and side surfaces of each of the plurality of keycaps cutting each of the plurality of keycaps from the fixture.

* * * * *